(12) United States Patent  (10) Patent No.: US 9,158,431 B2
Little  (45) Date of Patent: Oct. 13, 2015

(54) APPARATUS AND METHOD FOR MANIPULATING THE ORIENTATION OF AN OBJECT ON A DISPLAY DEVICE

(71) Applicant: Intergraph Corporation, Madison, AL (US)

(72) Inventor: David Dean Little, Cypress, TX (US)

(73) Assignee: Intergraph Corporation, Madison, AL (US)

( * ) Notice: Subject to any disclaimer, the term of this patent is extended or adjusted under 35 U.S.C. 154(b) by 88 days.

(21) Appl. No.: 13/904,470

(22) Filed: May 29, 2013

(65) Prior Publication Data

US 2014/0359535 A1  Dec. 4, 2014

(51) Int. Cl.
*G06F 3/0481*  (2013.01)
*G06F 3/0488*  (2013.01)

(52) U.S. Cl.
CPC .......... *G06F 3/04815* (2013.01); *G06F 3/0488* (2013.01); *G06F 3/04886* (2013.01)

(58) Field of Classification Search
None
See application file for complete search history.

(56) References Cited

U.S. PATENT DOCUMENTS 6,618,643 B2 * 9/2003 Nishiyama et al. ........... 700/200
2009/0303231 A1 * 12/2009 Robinet et al. ................ 345/419

OTHER PUBLICATIONS

"Using iPad or iPhone as a 3D controller for SolidWorks," Graphics Systems SolidNotes, http://blog.gxsc.com/graphics_systems_solidnot/2012/02/draft-using-ipad-as-a-3d-controller-for-solidworks.html, Feb. 9, 2012.*
"Understanding Construction Drawings for Housing and Small Buildings", p. 35, Cengage Learning, Mar. 14, 2011.*
"Maide Control—3D CAD Control with your iPad", 0:06/1:15, Youtube video, uploaded on Oct. 10, 2011.*
"Maide Control—3D CAD Control with your iPad", 1:00/1:15, Youtube video, uploaded on Oct. 10, 2011.*
"Using iPad or iPhone as a 3D controller for SolidWorks," *Graphics Systems SolidNotes*, http://blog.gxsc.com/graphics_systems_solidnot/2012/02/draft-using-ipad-as-a-3d-controller-for-solidworks.html, 3 pages, Feb. 9, 2012.

* cited by examiner

*Primary Examiner* — Joni Richer
*Assistant Examiner* — Yi Wang
(74) *Attorney, Agent, or Firm* — Sunstein Kann Murphy & Timbers LLP

(57) ABSTRACT

A method of manipulating a three-dimensional object displays a first view of a three-dimensional object on a touchscreen. The touchscreen has three-dimensional views associated with at least one pre-specified visually undelineated portion of the touchscreen. The method receives a touch input on the touchscreen in a visually undelineated portion, and determines a second view of the three-dimensional object based on the view assigned to the visually undelineated portion that received the touch input. The method displays the second view of the three-dimensional object on the touchscreen.

11 Claims, 15 Drawing Sheets

APPARATUS AND METHOD FOR MANIPULATING THE ORIENTATION OF AN OBJECT ON A DISPLAY DEVICE

FIELD OF THE INVENTION

The invention generally relates to displaying a three-dimensional object on a computing device and, more particularly, the invention relates to displaying standard views based on touch inputs.

BACKGROUND OF THE INVENTION

Modern computing devices or computer systems commonly permit a user to view a displayed three-dimensional object from nearly any viewpoint. For example, an architect can design a new house or building using a computer aided design package, and then display that house from any of a variety of angles, such as from the top and sides of the house. To that end, many widely available computer design packages display toolbars and pallets that enable user control of the object. Among other things, the toolbar can have buttons, sliders, or other visual indicia that, when selected or otherwise manipulated by a user, causes the object or viewpoint to move in a desired manner.

This type of user interface/display control has been effective for many years, especially in the desktop computer space and high performance computing space. Undesirably, however, with the accelerating trend toward smaller, portable devices, such as smartphones and tablets, these important toolbars and pallets can take up a great deal of screen space. In fact, they can take up so much space that the ultimate object being displayed may have very little room to maneuver and have significant size limitations.

SUMMARY OF VARIOUS EMBODIMENTS

In accordance with one embodiment of the invention, a method of manipulating a three-dimensional object displays a first view of a three-dimensional object on a touchscreen. The touchscreen has three-dimensional views associated with at least one pre-specified visually undelineated portion of the touchscreen. The method receives a touch input on the touchscreen in a visually undelineated portion, and determines a second view of the three-dimensional object based on the view assigned to the visually undelineated portion that received the touch input. The method displays the second view of the three-dimensional object on the touchscreen.

The visually delineated portion may be free of visual indicia related to manipulation of the three-dimensional object. Moreover, no more than part of the touchscreen has visually undelineated portions with associated views.

The method may determine the second view based on a location on the touchscreen of the touch input. The method may further determine the second view based on a location on the touchscreen of a three-finger tap. Among other things, the second view may be one of a plurality of standard views based on the location on the touchscreen of the touch input. Exemplary standard views include a northwest isometric view, a northeast isometric view, a southwest isometric view, a southeast isometric view, a rear elevation view, a left elevation view, a right elevation view, a front elevation view, and a top plan view.

In accordance with another embodiment of the invention, a computer program product has a non-transitory computer-readable medium with computer code thereon for manipulating a three-dimensional object. The computer code includes program code for displaying a first view of a three-dimensional object on a touchscreen. The touchscreen has three-dimensional views associated with at least one pre-specified visually undelineated portion of the touchscreen. The computer code includes program code for receiving a touch input on the touchscreen in the visually undelineated portion, and program code for determining a second view of the three-dimensional object based on the view assigned to the visually undelineated portion receiving the touch input. The computer code further includes program code for displaying the second view of the three-dimensional object on the touchscreen.

In accordance with another embodiment, an apparatus has a touchscreen for displaying a plurality of views of a three-dimensional object. To that end, the touchscreen is configured to have a plurality of undelineated touchscreen portions when displaying the three-dimensional object. In addition, the apparatus also has a sensor configured to detect and determine selection of the undelineated portions of the touchscreen in response to touch input, and a view controller operatively coupled with the sensor. The view controller is configured to associate each undelineated portion with one of a plurality of different views of the three-dimensional object. Moreover, the view controller also is configured to cause the touchscreen to display (after selection of one of the undelineated portions) the view of the three-dimensional object associated with the selected undelineated portion.

In accordance with another embodiment, a method of manipulating a three-dimensional object displays a first view of a three-dimensional object on a display device. The display device is configured to display a three-dimensional view associated with at least one pre-specified visually undelineated portion of the touchscreen. The method also receives an input on the display device relating to the at least one visually undelineated portion. The method further determines a second view of the three-dimensional object based on the view assigned to the at least one visually undelineated portion related to the received input. Additionally, the method displays the second view of the three-dimensional object on the display device.

In various embodiments, the input may include selection by a mouse, and/or the display device may include a touchscreen.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Illustrative embodiments maximize available screen real estate on computer devices that have the capability of manipulating the orientation of an object it displays. Accordingly, smaller display devices, such as tablets, portable computers, laptops, and smartphones, can provide significant functionality for changing the object's viewpoint without obscuring much of the screen. To that end, the computer system/computing device has a display (e.g., a touchscreen display) that is divided into a plurality of visually undelineated portions. Receipt of some prescribed input, such as a touch input, at any of the portions causes the object to change its orientation in some manner. For example, a tap in the top quadrant of a touchscreen device can cause a displayed object to rotate 180 degrees. Details of various embodiments are discussed below.

Figure 1A:
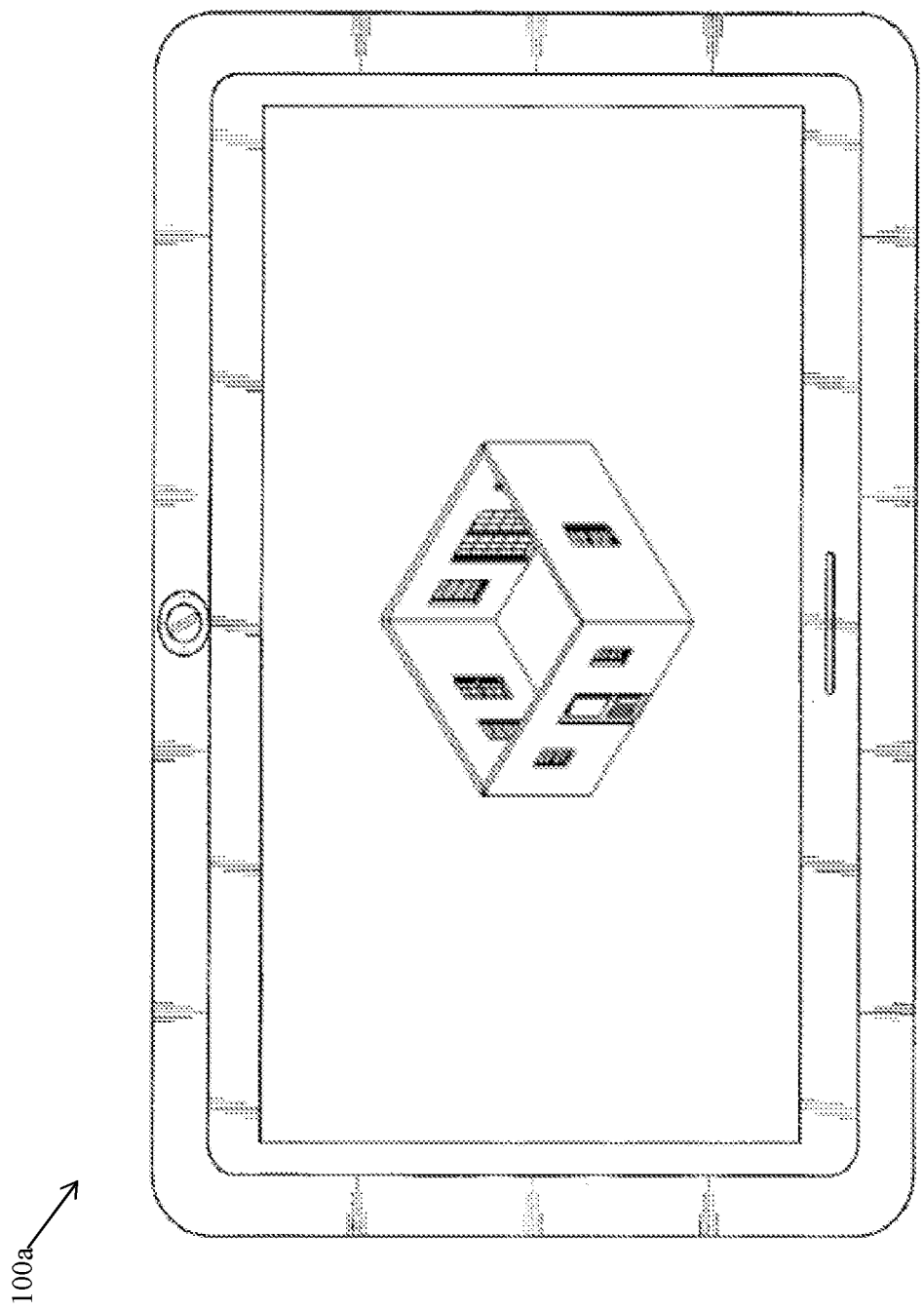
FIGS. 1A-1E schematically show a computing device displaying different views of an object after the computing device has received prespecified inputs.

FIG. 1A schematically shows a computer device that may be configured in accordance with various embodiments of the invention. Specifically, the device shown in FIG. 1A is a tablet having a touchscreen displaying an object in a first orientation. Note that the touchscreen in this example simply shows the object and little else. The trained user nevertheless understands that the tablet has logic that alters the orientation of the object depending on receipt of certain input (discussed below) with regard to the display.

Figure 1B:
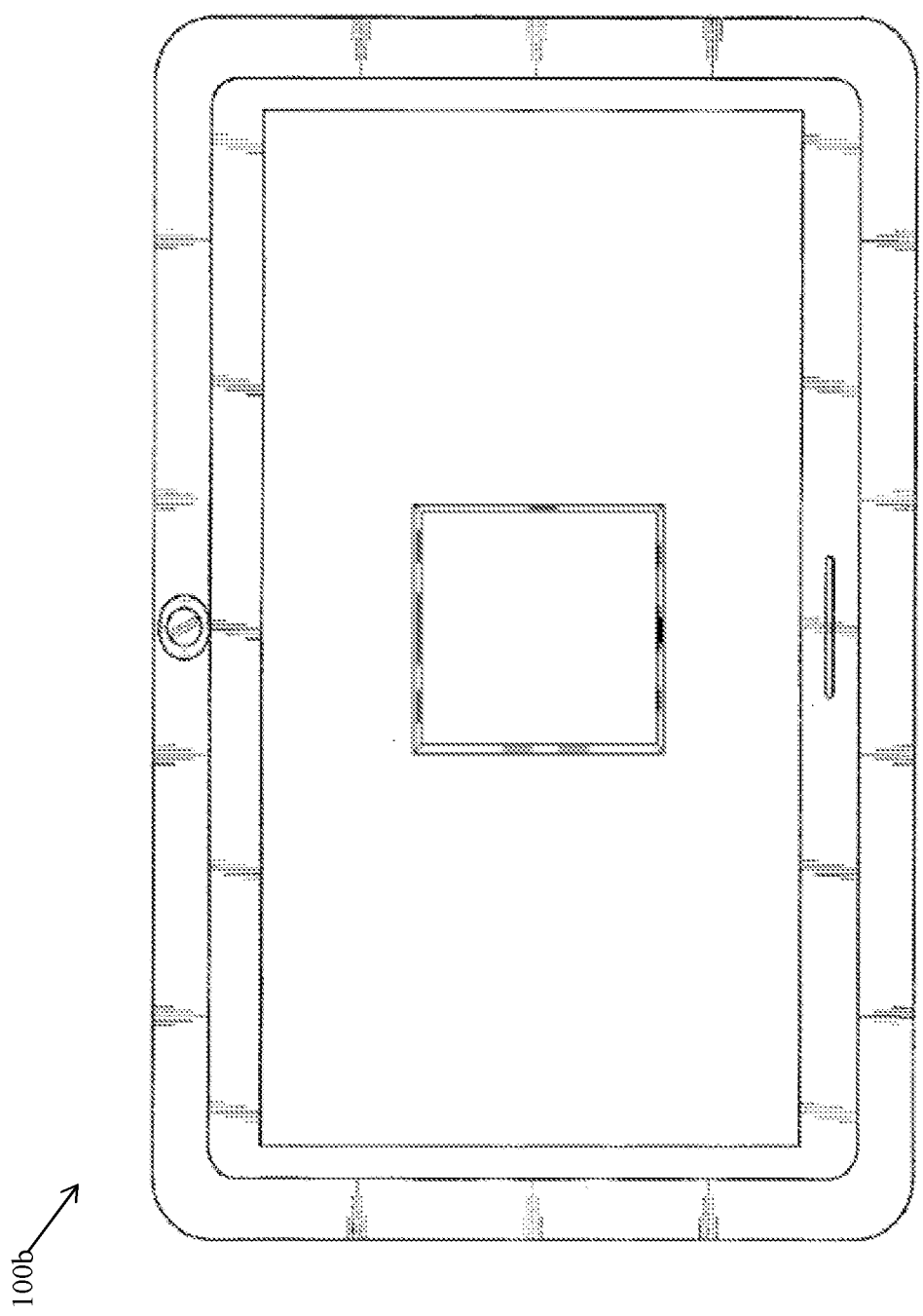
Figure 1C:
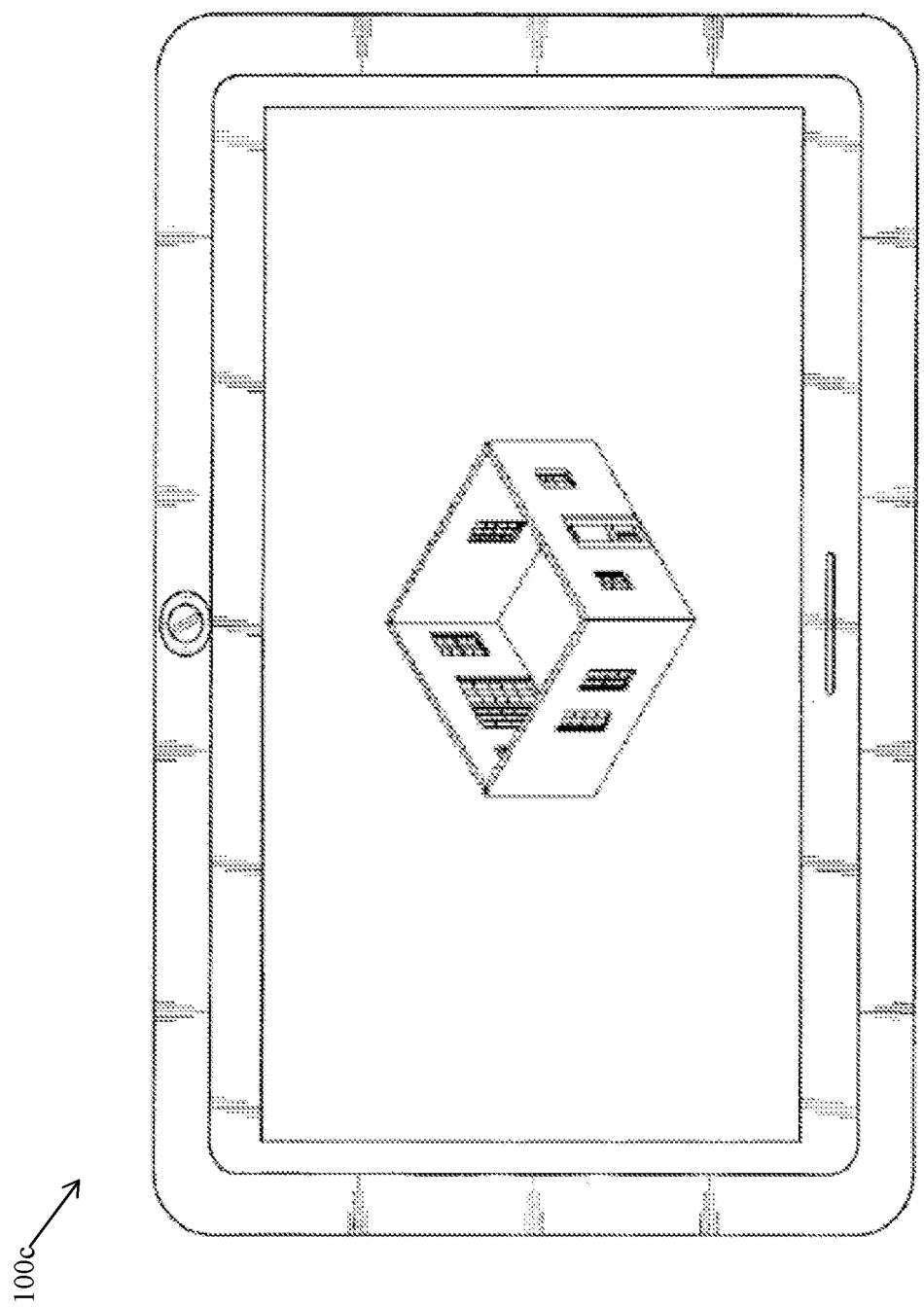
Figure 1D:
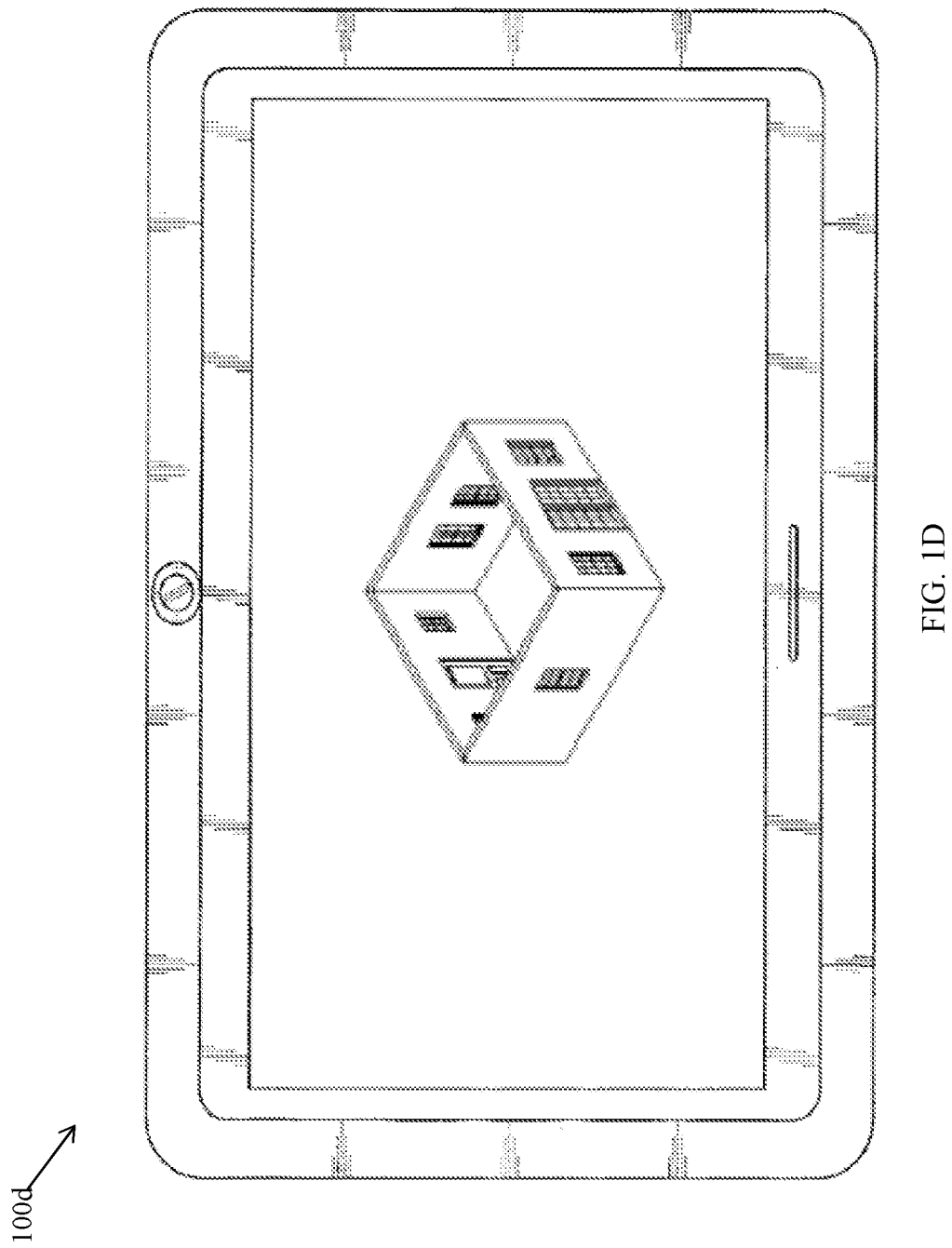
Figure 1E:
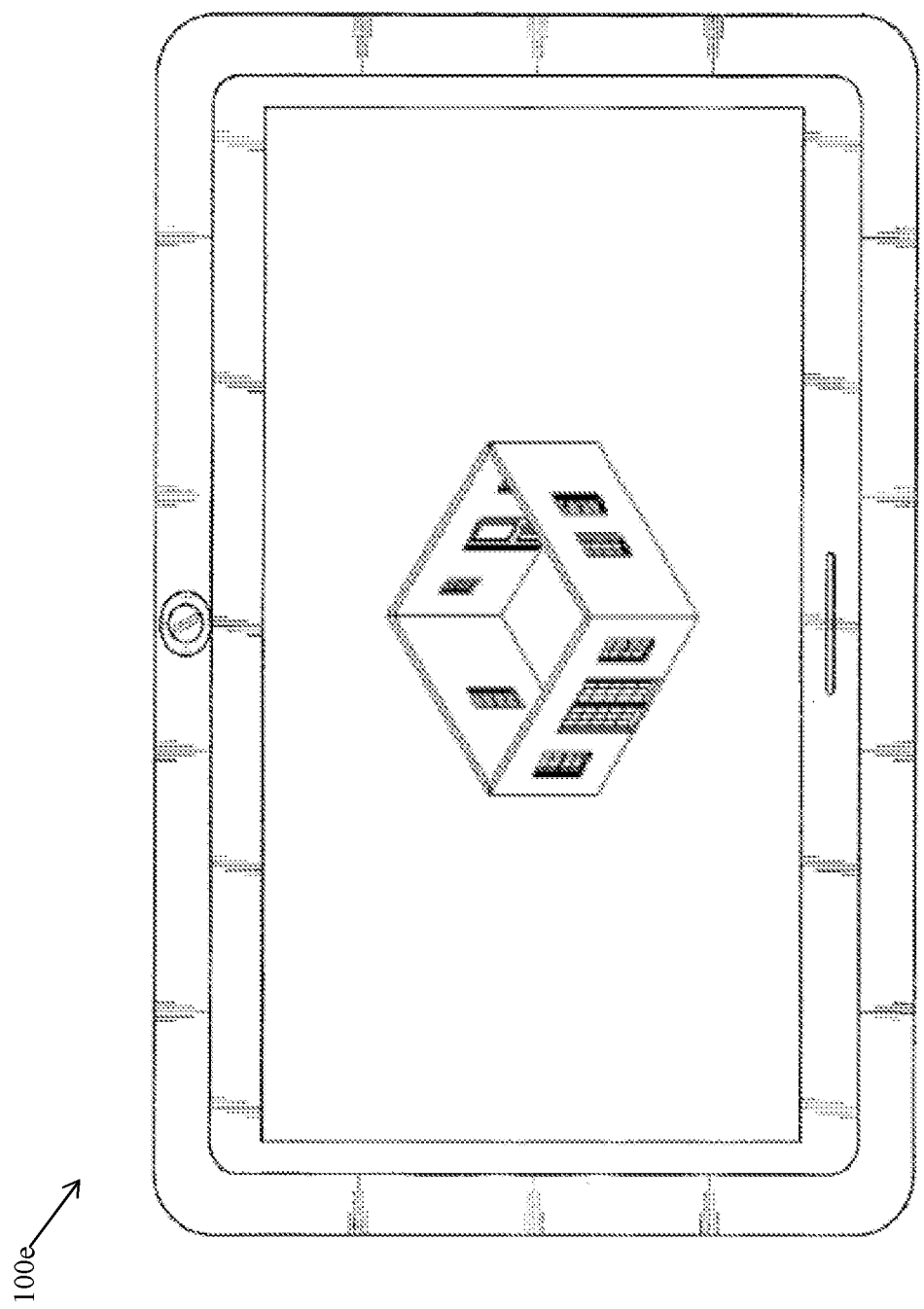

FIG. 1B thus schematically shows another view of the object after the tablet has received the prespecified input (discussed below). In this case, the object has been rotated to show a top view. FIGS. 1C-1E show a plurality of other potential views of the object that also were formed in response to the noted input. Those views include certain so-called "standard views," which, among other ways, may be predefined by some standards organization, well known, or defined by the user or some other person. As an example, those views may include a northwest isometric view, a northeast isometric view, a southwest isometric view, a southeast isometric view, a rear elevation view, a left elevation view, a right elevation view, a front elevation view, and a top plan view. Other views are possible and thus, the discussed views are but illustrative of any number of different views.

Illustrative embodiments can be used in any of a variety of different fields. For example, three-dimensional (3D) modeling is a useful design tool applicable to numerous technologies, such as in computer aided design and three-dimensional printing. For example, product designers can use 3D modeling to visualize and refine prototypes for consumable goods, and engineers can use modeling to develop internal infrastructure for industrial buildings. Programs for 3D modeling allow users to adjust his or her view of an object to aid in the design process. For example, a user may zoom in on a portion of the object, and add, delete, or adjust features in that particular view. In another example and in illustrative embodiments, the user may adjust the object to view it from different perspectives.

Figure 2:
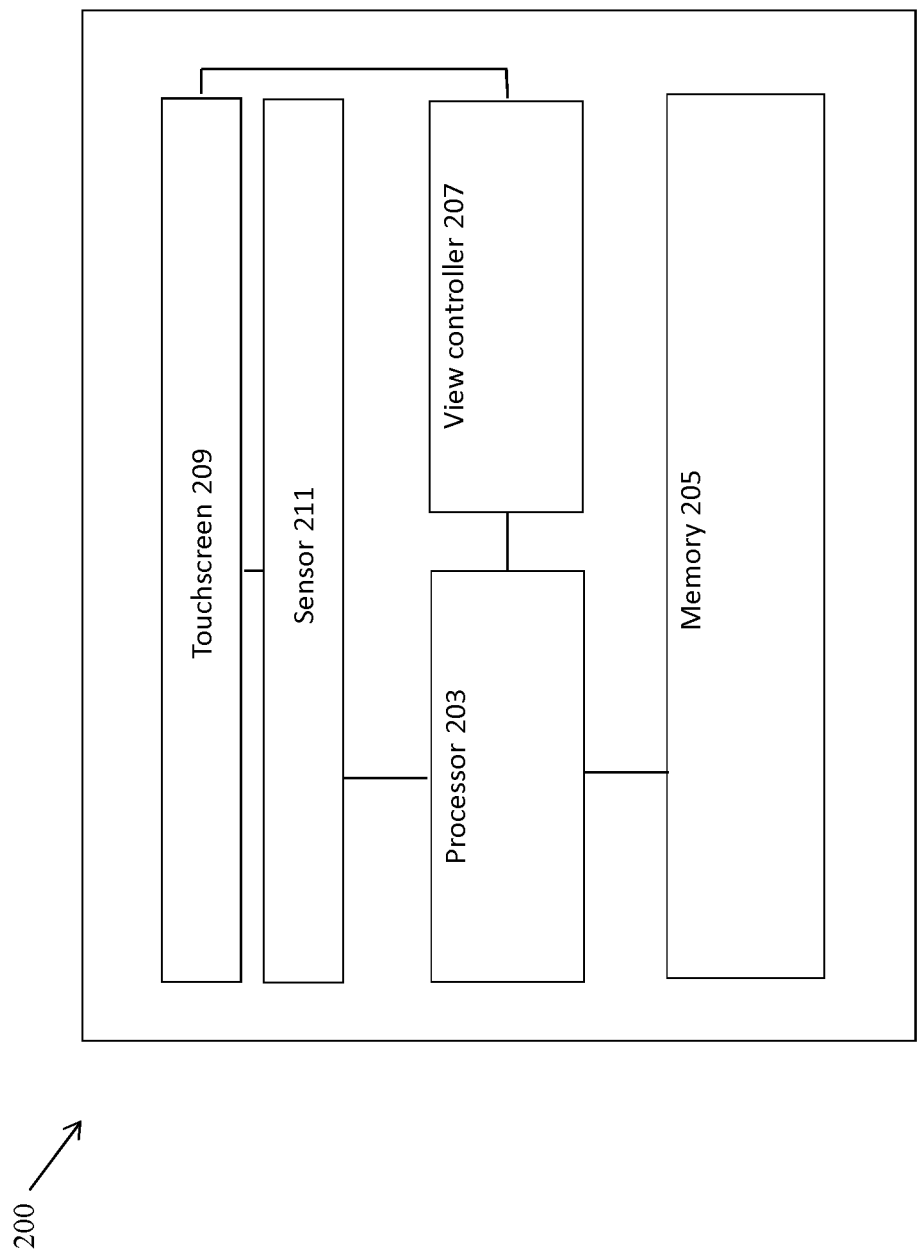
FIG. 2 shows an exemplary functional block diagram of a computing device that uses the 3D modeling program described herein.

FIG. 2 shows an exemplary block diagram of a computing device 200 that uses the 3D modeling program described herein. The computing device 200 includes a processor 203 that executes program code corresponding to the modeling program described herein. The program code may be stored in the memory 205. The file for an object may also be stored in the memory 205. The processor 203 sends the data corresponding to a view of the object to the view controller 207. The view controller 207 drives this view to the touchscreen 209 for display. When a user applies a touch input to the touchscreen 209, the sensor 211 of or coupled to the touchscreen 209 sends the touch input (e.g., location, type of touch) to the processor 203. If the touch input invokes a command to display the object in a different view, the processor 203 sends the data corresponding to the different view of the object to the view controller 207, When a 3D modeling program executes on a haptic computing device, such as a tablet or a laptop with or without a touchscreen, the program typically displays the object within a smaller area than the display screens available on desktop computers, by way of example. Given the limited space for display, the inventor recognized that it would be advantageous to maximize the amount of space for displaying the object of interest. Accordingly, various embodiments implement hidden controls to manipulate an object via predetermined, visually undelineated touch input locations on a touchscreen, e.g. there is no need for specialized graphical user interface indicia, such as a specialized toolbar or pallet, to manipulate the orientation of the object. Accordingly, illustrative embodiments reduce the amount of screen space needed for displaying graphical controls and objects.

Additionally, the user also can use other touch inputs to control the object in other manners (e.g., zoom in, rotate, delete feature). By also encoding predetermined touch inputs as controls to obtain standard views (e.g., top view, side view, etc.), the user can interact with the object through a series of different touch inputs in a seamless manner.

A viewing control can be based on a number of different criteria, such as the type of touch input, the location where the touch input is received, or both. For example, a viewing control may correspond to a particular type of touch input received on a pre-specified portion of the touchscreen. In illustrative embodiments, when displaying the 3D object, the pre-specified portions are visually undelineated on the touchscreen, thereby leaving the displayed 3D object unobscured. In other words, when displaying the 3D object, the display does not display any border lines or other indicia indicating the delineation between the different portions of the touchscreen.

The 3D modeling program can display information about the undelineated portions at certain times, such as when it is not displaying the object. For example, when a 3D modeling program implementing certain embodiments is first installed on a haptic computing device, the program may display the bounds of each undelineated portion and their associated viewing controls, organized by type of touch input. After installation, some embodiments may show the bounds of the different portions in response to some user interaction, such as in response to a user's swipe of the touchscreen from one corner to another opposing corner. The program also may display information about how to access its help menu, as well as a link to an online help manual. In some embodiments, the displayed bounds may fade over a period of time (e.g., 5 seconds), or the bounds may disappear when the user repeats the predetermined touch input.

As noted above, the modeling program may not change the viewpoint of the object by the mere touch on one of the undelineated portions. Instead, the system preferably is programmed to respond to some predetermined type of touch input. For example, the predetermined touch input may be a single five finger tap (i.e., a simultaneous tap of five fingers on the touch input), a four finger tap, a three finger tap, a two finger tap, or a one finger tap. As another example, the input may require multiple taps (e.g., two, three, or four taps). Other exemplary types of touch inputs include triple taps, drawing either one- or two-fingered circles, a combination of a double tap with a swipe, or swiping in the format of prespecified characters, Some embodiments may require a more sophisticated touch pattern. For example, to rotate or otherwise manipulate the view of the object, some embodiments may require a prescribed pattern of multiple touch inputs on certain quadrants. Continuing with the above example with four quadrant undelineated portion display, to rotate an object to a side view, some embodiments may require that the user tap the top left quadrant, followed by the bottom right quadrant, and again followed by the top left quadrant.

Figure 3:
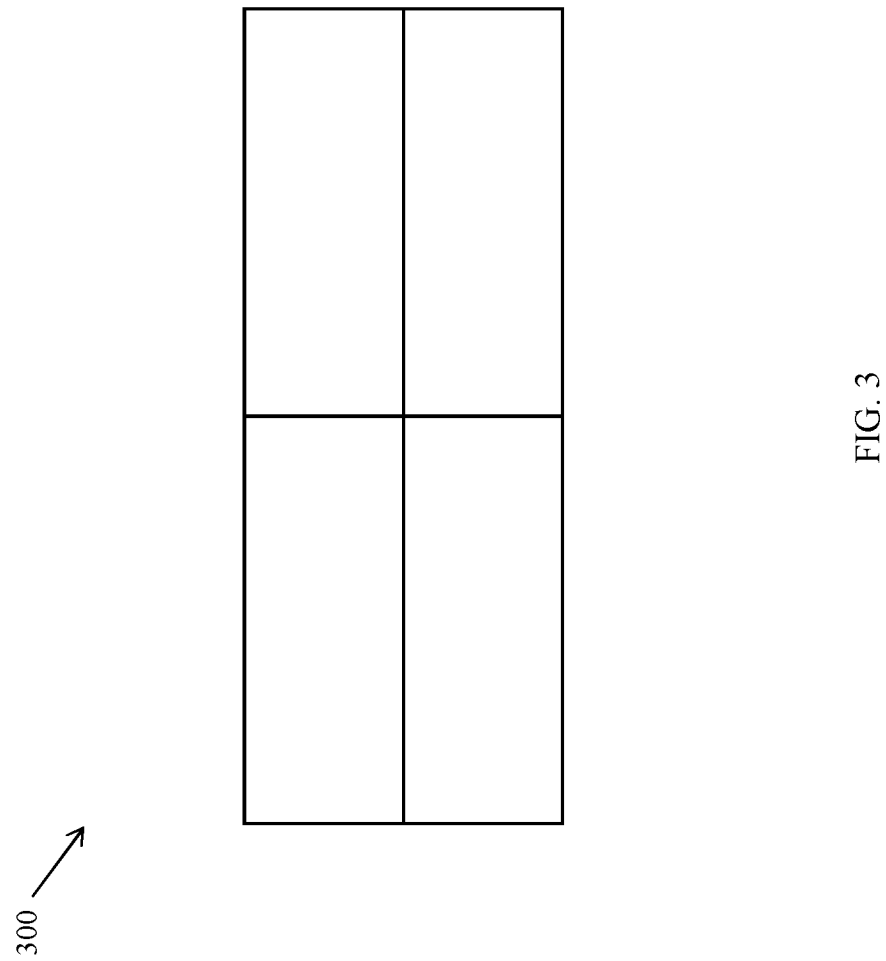
FIGS. 3-9 show exemplary touchscreens that have been divided into portions that each correspond to a different touch input command. Although the portions are normally undelineated on the touchscreen, the bounds are depicted here for clarity.
Figure 4:
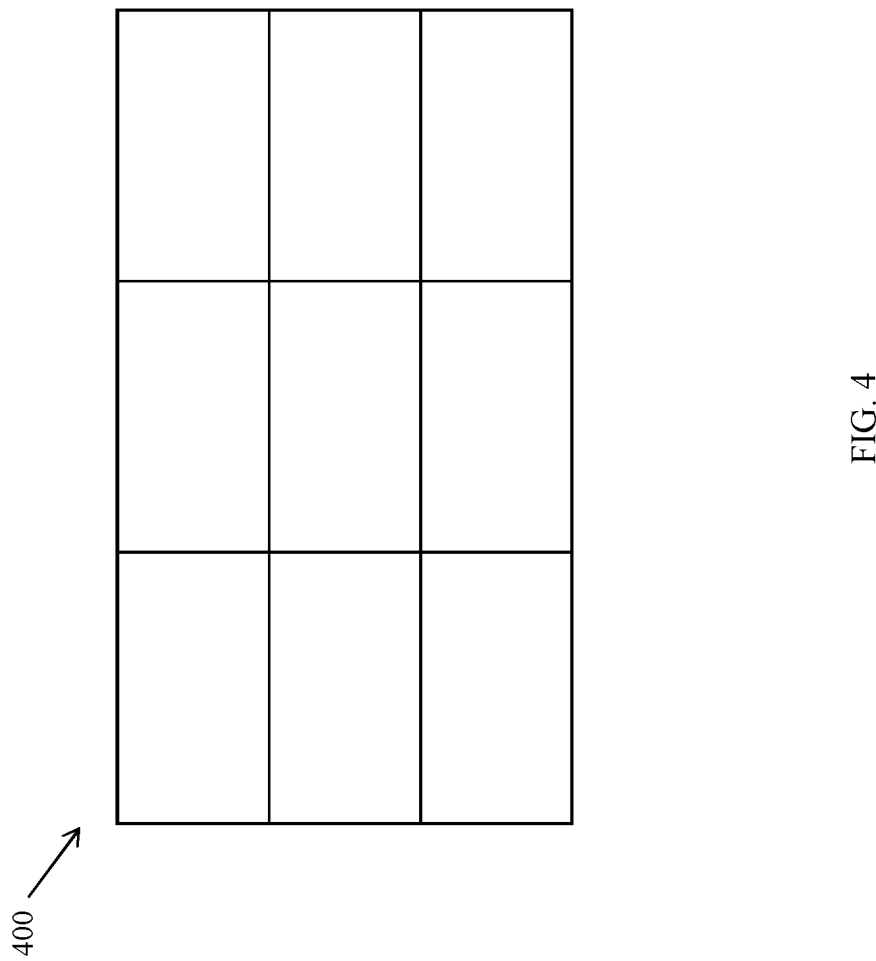
Figure 5:
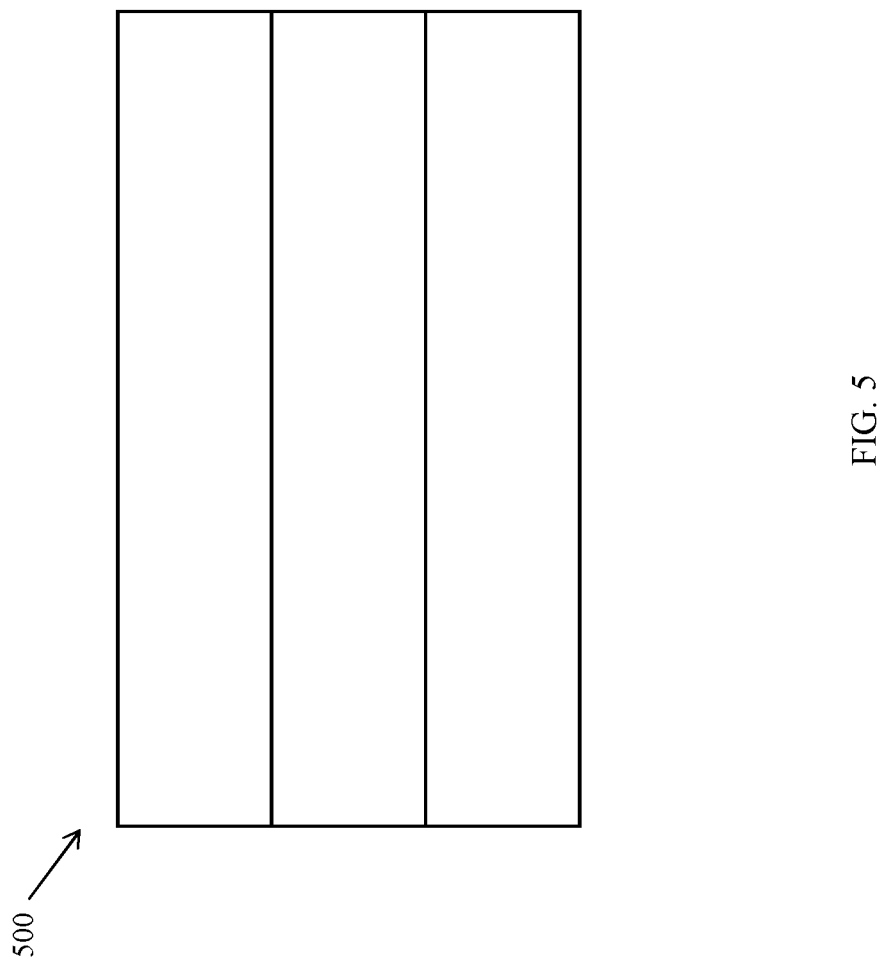
Figure 6:
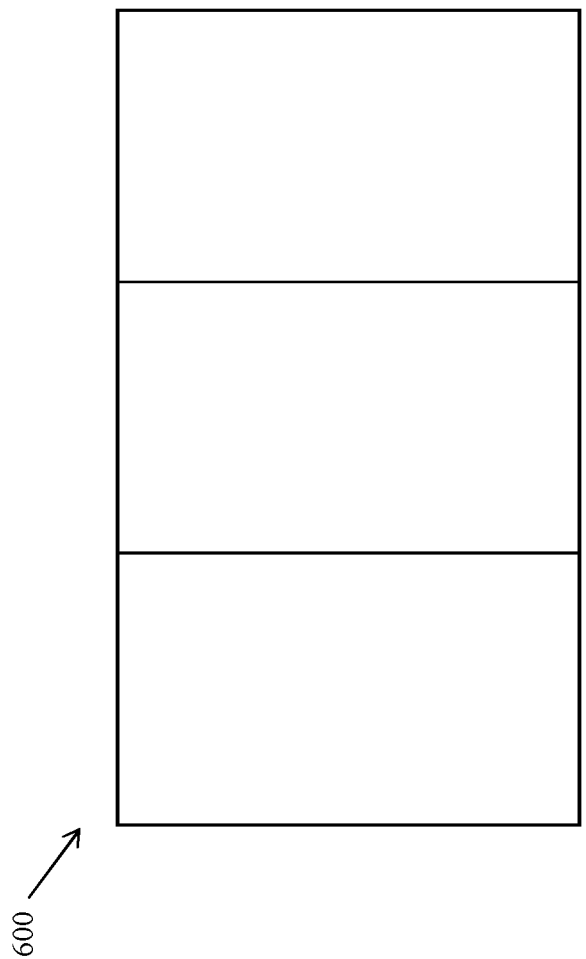
Figure 7:
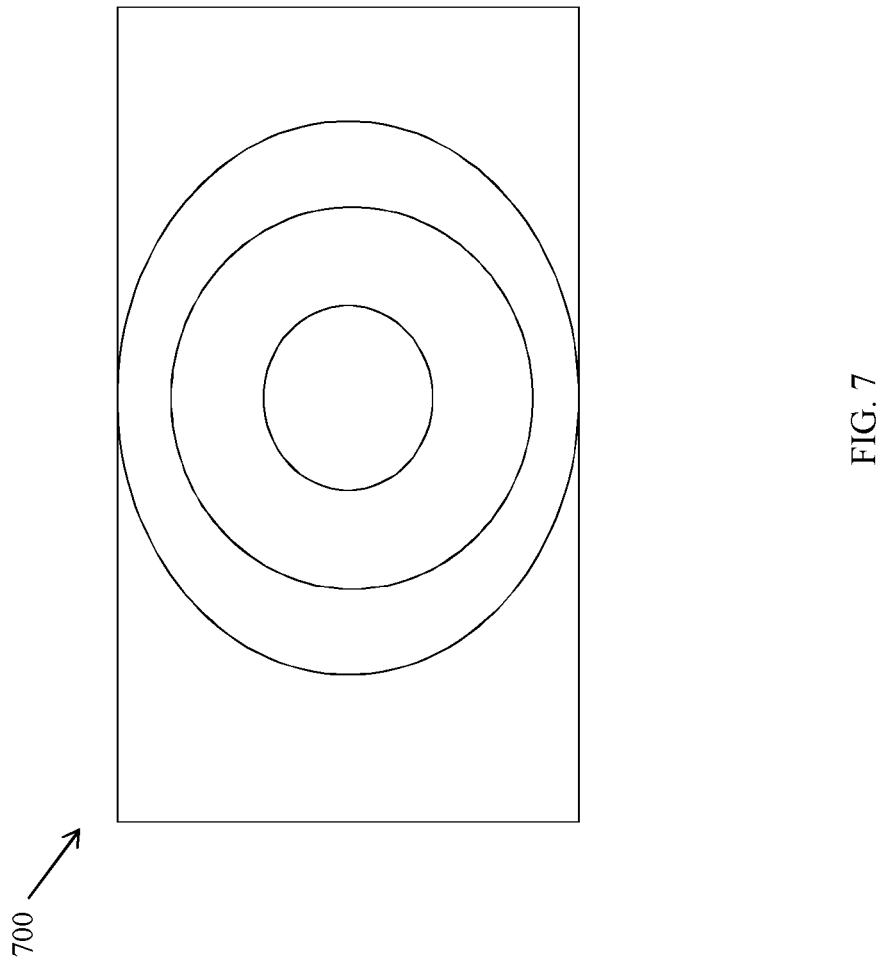
Figure 8:
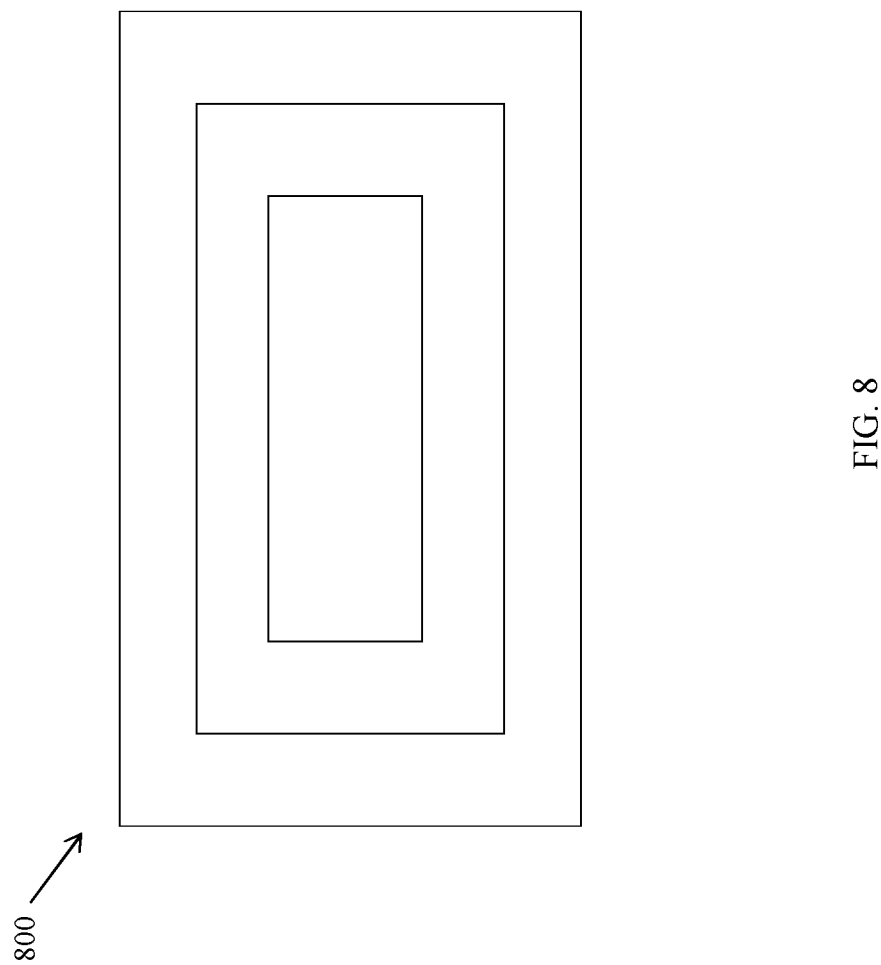
Figure 9:
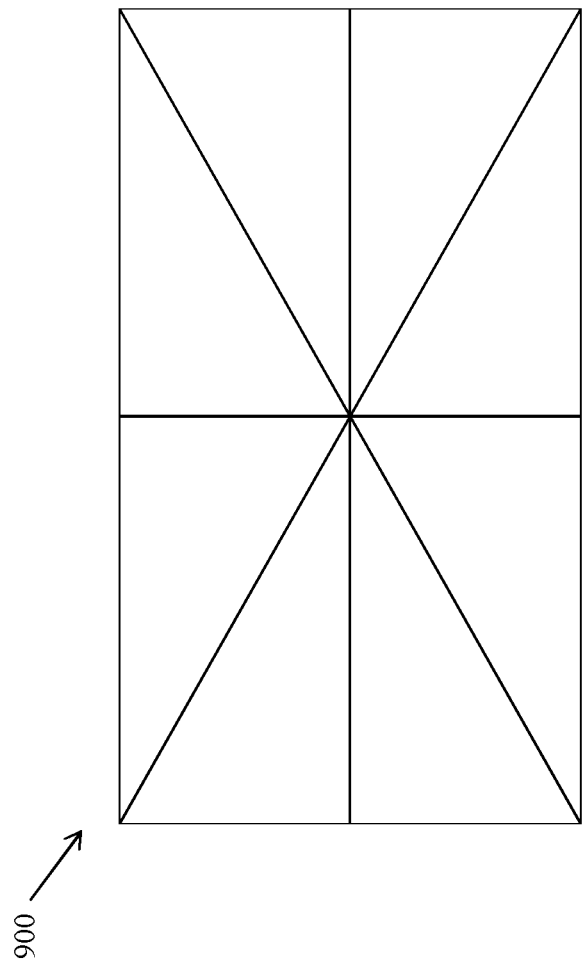

The touchscreen may be divided into uniformly or non-uniformly sized and shaped portions, e.g., a grid or matrix. To that end, FIGS. 3-9 schematically show a variety of different non-exhaustive ways of dividing the touchscreen. For example, FIG. 3 shows the touchscreen divided into quadrants 300, while FIG. 4 shows a 3×3 grid 400. In another example, the touchscreen may be divided into rows 500 or columns 600, as depicted in FIGS. 5 and 6. In contrast, the touchscreen may be divided into portions based on a distance from a reference point. Thus, the touchscreen may be divided into concentric circles radiating from its center 700, as depicted in FIG. 7. As yet another example, the touchscreen may be divided into concentric rectangles 800, as depicted in FIG. 8. The touchscreen may be divided into sections based on a touch input's angle with respect to a reference point. In these embodiments, the portions may be bounded by the edge of the screen and lines radiating from the touchscreen's center 900, as depicted in FIG. 9. Indeed, some embodiments divide the touchscreen into irregularly shaped or sized portions.

As suggested above, the user may configure the pre-specified portions of the touchscreen. More specifically, the 3D modeling program may have a utility that permits the user to select all requirements for manipulating an object. Accordingly, the user may specify how the touchscreen shall be divided, and which specific input (touch or non-touch) shall produce the desired functionality. The user may draw the bounds of the portions on the screen. The modeling program may save the user-configured pre-specified portions in response to another, or the same, predetermined touch inputs.

The user also may change how the touchscreen is divided into pre-specified portions. For example, the user may apply a predetermined touch input (e.g., a circular motion around the perimeter of the display screen, an "X" motion on the screen) to change the pre-specified portions. The 3D modeling program may display a different manner of dividing the touchscreen in response to each application of the predetermined touch input (e.g., quadrants, four concentric rectangles). The user may continue applying the touch input to change the touchscreen portions until the program displays the pre-specified portions that the user wants to use.

Figure 10:
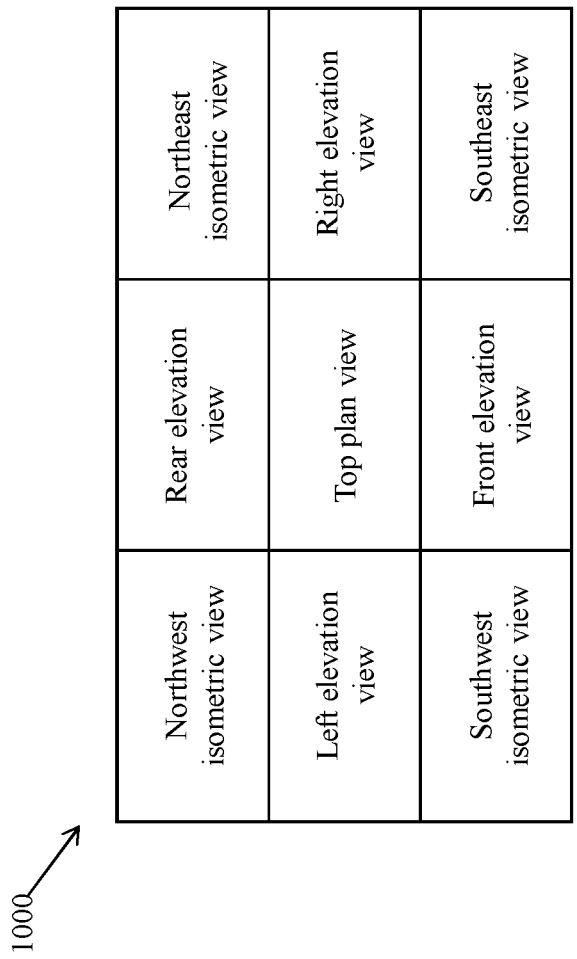
FIG. 10 depicts exemplary associations between standard views for an object and portions of a 3×3 grid on a touchscreen.

In one example discussed above, for a set of touch input controls, the type of touch input is a triple tap and the pre-specified portions of the touchscreen are portions on a 3×3 grid. When the user triple taps in one of the portions of the 3×3 grid, the 3D modeling program may display the 3D object in one of a northwest isometric view, a northeast isometric view, a southwest isometric view, a southeast isometric view, a rear elevation view, a left elevation view, a right elevation view, a front elevation view, or a top plan view. FIG. 10 depicts exemplary associations between standard views for an object and portions of a 3×3 grid 800 on a touchscreen.

To that end, the object's file illustratively contains information for displaying the object in the standard views. For example, the object file may include coordinates for orienting the object on the display screen according to each of the standard views. Thus, in those embodiments, the 3D modeling program determines the information for displaying the object in the standard views from the object's file. More specifically, the modeling program may derive the relative pixel coordinates of each pixel in the object for orienting the object based on the data in the file. The 3D modeling file of an object may follow a standard format regarding the data for the object with respect to the object's orientation. For example, the X, Y, and Z coordinates for the data may depict the object from a front elevation view. In these embodiments, the program may already store information (e.g., relative coordinates) for viewing the object from the different standard views relative to the front elevation view. When the program opens the object's file, the program associates the information for viewing the object from the different standard views with the touch input controls corresponding to the views.

Moreover, as noted above, the user may configure the views associated with different portions of the touchscreen. To that end, the user may first select the manner in which the touchscreen is divided into pre-specified portions. For example, the user may apply a predetermined touch input (e.g., a circular motion around the perimeter of the display screen, or an "X" motion on the screen) to view different manners of dividing the touchscreen (e.g., quadrants, 3×3 grid, concentric rectangles). The modeling program then may display the bounds of the portions, which would normally be undelineated when displaying the object. In response to each application of the predetermined touch input, the program may display another manner of dividing the touchscreen in response to each application of the predetermined touch input. In some embodiments, configuring the views is allowed only for a predetermined manner of dividing the touchscreen into portions. For example, the program may allow the user to select views only for portions in a 3×3 grid.

After the use has selected the manner in which the touchscreen is divided into portions, the user may apply additional predetermined touch input(s) for selecting the views to associate with the portions. For example, the user may apply a touch input to enter a mode for selecting views to associate with the portions. The user may select a portion of the touchscreen, manipulate an object (e.g., a cube, a three-dimensional model of a person) to a view, and associate the view with the portion. In some embodiments, the user may tap a portion (e.g., quadrant), manipulate an object to a top view, and tap the portion again to associate the top view with the tapped portion. In some embodiments, the user may manipulate an object by entering coordinates corresponding to a view. The user may perform comparable actions for the other portions of the touchscreen.

After the 3D modeling program enters the selecting mode, the user may manipulate the object to a view, and then assign the view to a portion. The user may manipulate an object to a first view, and then apply a predetermined touch input to associate the first view with a portion of the touchscreen. The user then manipulates the object to a second view and then applies a predetermined touch input to associate the second view with a different portion of the touchscreen. In one example, the user manipulates the object to a front elevation view, applies a two-finger tap, and drags his or her fingers to an upper left quadrant of the touchscreen. Then, the user manipulates the object to a rear elevation view, applies a two-finger tap, and drags his or her fingers to an upper right quadrant of the touchscreen. The user repeats comparable steps until all the portions of the touchscreen have an associated view.

Various embodiments may set the undelineated portions to be intuitive regions on the touchscreen, thus facilitating manipulation of the object. For example, in a 3×3 grid of undelineated portions, the center portion may correspond to a front elevation view of an object. In a similar manner, the top left portion, top right portion, bottom left portion, and bottom right portion may correspond to a northwest isometric view, a northeast isometric view, a southwest isometric view, and a southeast isometric view, respectively. The top center portion and the bottom center portion may correspond to the top plan view and the bottom plan view, respectively. Other embodiments may have similar correlations between where the user contacts the touchscreen and the view of the object. Accordingly, as with many other embodiments, discussion of a 3×3 grid is one example and not intended to limit all embodiments.

In various embodiments, the angular displacement of the view associated with an undelineated portion of a touchscreen relative to the front elevation view may be correlated with the angular displacement of the position of the undelineated portion associated with the view relative to the undelineated center portion of the touchscreen. The example above is but one implementation of this configuration.

Figure 11:
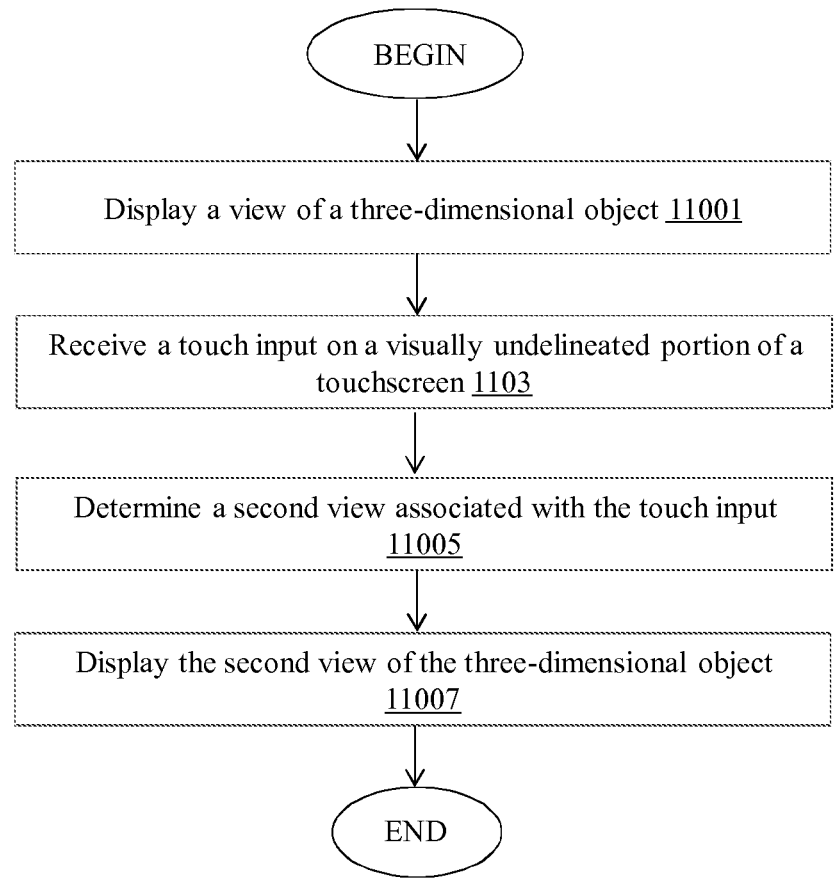
FIG. 11 depicts an exemplary flow diagram for displaying a three-dimensional object in different views based on touch inputs received on undelineated portions of a touchscreen.

FIG. 11 depicts an exemplary process for displaying a three-dimensional object in different views based on touch inputs received on undelineated portions of a touchscreen. The process begins at step 11001, in which a 3D modeling program executing on a haptic or other type of computing device displays a view of a three-dimensional object.

Next, after some time, the computing device receives a touch input on a visually undelineated portion of a touchscreen (step 11003). To that end, the computing device has a touch sensor or other device that detects touch input on its touch screen. For example, the touch screen may have a capacitive or piezoelectric touch sensitive screen currently in wide use. A view controller or other logic within the computing device detects the type of input (e.g., number of taps, pattern of a swipe, or number of fingers), and determines which region of the display is touched.

If the logic determines that an appropriate touch input has been received in a specified undelineated region of the touchscreen, then the view controller determines a second view associated with that input (step 11005). Specifically, the view controller identifies a second view based on the visually undelineated portion of the touchscreen, the type of touch input, or both. The view controller thus gathers the appropriate information (e.g., from the object files) and causes the 3D modeling program to display the second view of the three-dimensional object (step 11007). Accordingly, the touchscreen may change directly to the second view (i.e., just show a different image with the second view), or may rotate the object to the second view, thus showing an animation of the rotation or movement to the second view.

Some embodiments do not rely on touch input. Instead, such embodiments may respond to some other type of input. For example, the 3D modeling program simply may respond to selection by means of a conventional mouse, or some keyboard input. Another example may include use of some light source, such as a laser or spotlight, or application of a pressure signal to the display device.

The embodiments discussed above thus maximize the amount of screen real estate on a display device, such as a touchscreen, while still permitting a user to easily manipulate the displayed object. Of course, despite the vast improvements when used with small display devices, those in the art should understand that a number of embodiments also apply to larger display devices, such as large light emitting diode (LED) displays that take up a significant portion of a wall. Accordingly, discussion of smaller display devices is not intended to limit all embodiments of the invention.

It nevertheless should be noted that some embodiments modify the object or scene in ways other than simply changing the view of the object. In other words, some characteristic of the object or an underlying scene may change in response to prescribed input. For example, a double tap in a specific quadrant could cause a scene of a landscape to change from day to night, or cause an object to change colors, shape, have different logos or trademarks, etc. Accordingly, discussion of object view manipulation is but one example of plurality of different uses.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium.

The medium may be either a tangible medium (e.g., optical or analog communications lines) or a medium implemented with wireless techniques (e.g., WIFI, microwave, infrared or other transmission techniques). The series of computer instructions can embody all or part of the functionality previously described herein with respect to the system. The process of FIG. 2 is merely exemplary and it is understood that various alternatives, mathematical equivalents, or derivations thereof fall within the scope of the present invention.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A method of manipulating a three-dimensional object, the method comprising:
    configuring visually undelineated portions of a touchscreen such that each portion is associated with one of a northwest isometric view, a northeast isometric view, a southwest isometric view, a southeast isometric view, a rear elevation view, a left elevation view, a right elevation view, a front elevation view, or a top plan view of a three-dimensional object, wherein the entire touchscreen is free of visual indicia related to manipulation of the three-dimensional object;
    displaying a first view of the three-dimensional object on the touchscreen;
    receiving a touch input on the touchscreen in one of the visually undelineated portions;
    determining a second view of the three-dimensional object based on the view assigned to the visually undelineated portion receiving the touch input; and
    displaying the second view of the three-dimensional object on the touchscreen.

2. The method of claim 1 wherein determining the second view based on the touch input comprises:
    determining the second view based on a location on the touchscreen of the touch input.

3. The method of claim 2 wherein determining the second view based on the touch input comprises:
    determining the second view based on a location on the touchscreen of a three-finger tap.

4. A computer program product including a non-transitory computer-readable medium having computer code thereon for manipulating a three-dimensional object, the computer code comprising:
    program code for configuring visually undelineated portions of a touchscreen such that each portion is associated with one of a northwest isometric view, a northeast isometric view, a southwest isometric view, a southeast isometric view, a rear elevation view, a left elevation view, a right elevation view, a front elevation view, or a top plan view of a three-dimensional object, wherein the entire touchscreen is free of visual indicia related to manipulation of the three-dimensional object;
    program code for displaying the first view of a three-dimensional object on a touchscreen;
    program code for receiving a touch input on the touchscreen in one of the visually undelineated portions;
    program code for determining a second view of the three-dimensional object based on the view assigned to the visually undelineated portion receiving the touch input; and
    program code for displaying the second view of the three-dimensional object on the touchscreen.

5. The computer program product of claim 4 wherein the program code for determining the second view comprises program code for determining the second view based on a location on the touchscreen of the touch input.

6. The computer program product of claim 5 wherein the program code for determining the second view further comprises program code for determining the second view based on a location on the touchscreen of a three-finger tap.

7. An apparatus for displaying a three-dimensional object, the apparatus comprising:
    a touchscreen for displaying a plurality of views of a three-dimensional object, wherein (1) the touchscreen is configured to have visually undelineated touchscreen portions, and (2) the entire touchscreen is free of visual indicia related to manipulation of the three-dimensional object;
    a sensor operatively coupled with the touchscreen, the sensor being configured to detect and determine selection of the visually undelineated portions of the touchscreen in response to touch input; and
    a view controller operatively coupled with the sensor, the view controller being configured to associate each visually undelineated portion with one of a plurality of different views of the three-dimensional object, including a northwest isometric view, a northeast isometric view, a southwest isometric view, a southeast isometric view, a rear elevation view, a left elevation view, a right elevation view, a front elevation view, or a top plan view, and
    the view controller also being configured to cause the touchscreen to display, after selection of one of the undelineated portions, the view of the three-dimensional object associated with the selected undelineated portion.

8. The apparatus as defined by claim 7 wherein the touchscreen comprises a smartphone, a tablet, or a portable computer.

9. The apparatus as defined by claim 7 wherein the sensor is configured to detect touch by two or more fingers on a single undelineated portion of the touchscreen.

10. The apparatus as defined by claim 7 wherein the touchscreen has nine undelineated portions.

11. The apparatus as defined by claim 7 wherein the touchscreen forms a three-by-three matrix of undelineated portions.

* * * * *